(12) United States Patent
Fortner et al.

(10) Patent No.: US 10,874,992 B2
(45) Date of Patent: *Dec. 29, 2020

(54) COMPOSITE NANOSTRUCTURES HAVING A CRUMPLED GRAPHENE OXIDE SHELL

(71) Applicant: WASHINGTON UNIVERSITY, St. Louis, MO (US)

(72) Inventors: John Fortner, St. Louis, MO (US); Pratim Biswas, St. Louis, MO (US); Yi Jiang, St. Louis, MO (US); Weining Wang, St. Louis, MO (US)

(73) Assignee: Washington University, St. Louis, MO (US)

( * ) Notice: Subject to any disclaimer, the term of this patent is extended or adjusted under 35 U.S.C. 154(b) by 68 days.

This patent is subject to a terminal disclaimer.

(21) Appl. No.: 16/125,949

(22) Filed: Sep. 10, 2018

(65) Prior Publication Data

US 2019/0060840 A1   Feb. 28, 2019

Related U.S. Application Data

(63) Continuation of application No. 15/126,843, filed as application No. PCT/US2015/021084 on Mar. 17, 2015, now Pat. No. 10,099,184.

(Continued)

(51) Int. Cl.
| | |
|---|---|
| *B01D 69/14* | (2006.01) |
| *B82Y 30/00* | (2011.01) |
| *B82Y 40/00* | (2011.01) |
| *B01D 71/02* | (2006.01) |
| *B01D 69/12* | (2006.01) |
| *C02F 1/44* | (2006.01) |

(52) U.S. Cl.
CPC ........ *B01D 69/141* (2013.01); *B01D 69/125* (2013.01); *B01D 71/021* (2013.01); *B82Y 30/00* (2013.01); *B82Y 40/00* (2013.01); *C02F 1/44* (2013.01); *B01D 2323/30* (2013.01); *C02F 2305/08* (2013.01)

(58) Field of Classification Search
CPC ..... B01D 69/141; B01D 69/125; B01D 69/12
See application file for complete search history.

(56) References Cited

U.S. PATENT DOCUMENTS

| | | | |
|---|---|---|---|
| 8,563,169 | B2 | 10/2013 | Liu et al. |
| 2007/0128439 | A1 | 6/2007 | Kim et al. |

(Continued)

FOREIGN PATENT DOCUMENTS

| | | |
|---|---|---|
| CN | 103074619 A | 5/2013 |
| RU | 2009138975 A | 4/2011 |

(Continued)

OTHER PUBLICATIONS

Le, C., "Crumpled Graphene Oxide Nanostructures for Advanced Water Treatment Technologies", NNIN REU Research Accomplishments, 2013, pp. 66-67.

(Continued)

*Primary Examiner* — Krishnan S Menon
(74) *Attorney, Agent, or Firm* — Armstrong Teasdale LLP

(57) ABSTRACT

Composite nanostructures having a crumpled graphene oxide shell and a nanoparticle selected from titanium dioxide, silver and magnetite within the shell are disclosed. The nanostructures may be incorporated into a filtration membrane suitable for purifying water for targeted separations and for human consumption.

18 Claims, 28 Drawing Sheets

Related U.S. Application Data

(60) Provisional application No. 61/954,221, filed on Mar. 17, 2014.

(56) References Cited

U.S. PATENT DOCUMENTS

| | | |
|---|---|---|
| 2012/0285889 A1 | 11/2012 | Wan et al. |
| 2013/0004798 A1 | 1/2013 | Huang et al. |
| 2013/0344237 A1 | 12/2013 | Guo |
| 2013/0344392 A1 | 12/2013 | Huang et al. |

FOREIGN PATENT DOCUMENTS

| | | |
|---|---|---|
| WO | 2012170086 A1 | 12/2012 |
| WO | 2013023006 A2 | 2/2013 |

OTHER PUBLICATIONS

Ma et al., "Crumpled Nanopaper from Graphene Oxide", Nano Letters, 2012, 12, pp. 486-489.

Ocsoy et al., "Nanotechnology in Plant Disease Management: DNA-Direct Silver Nanoparticles on Graphene Oxide as and Antibacterial Against Xanthomonas Perforans", ACSNANO, 2013, vol. 7, No. 10, pp. 8972-8980.

International Search Report and Written Opinion for International Application No. PCT/US2015/021084, dated Jun. 25, 2015, 10 pages.

Wang et al., "Evaporation-Induced Crumpling of Graphene Oxide Nanosheets in Aerosolized Droplets: Confinement Force Relationship", J. Phys. Chem. Lett. 2012, vol. 3, pp. 3228-3233.

FIG. 31A | FIG. 31B
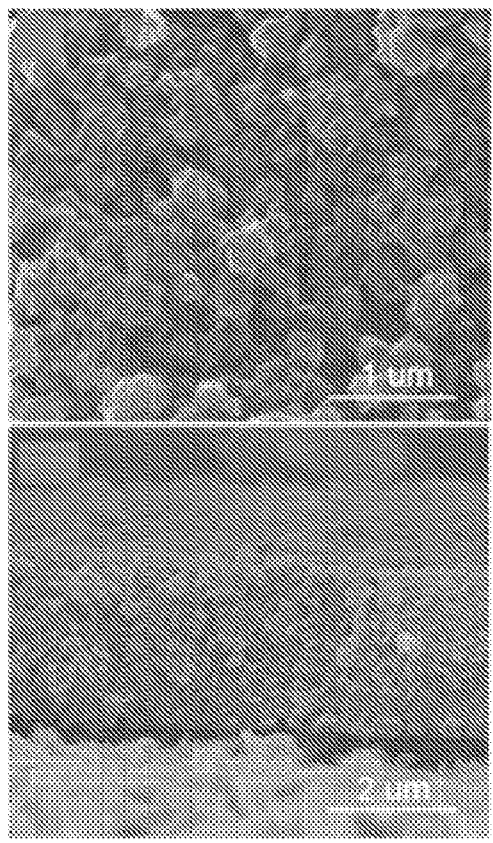 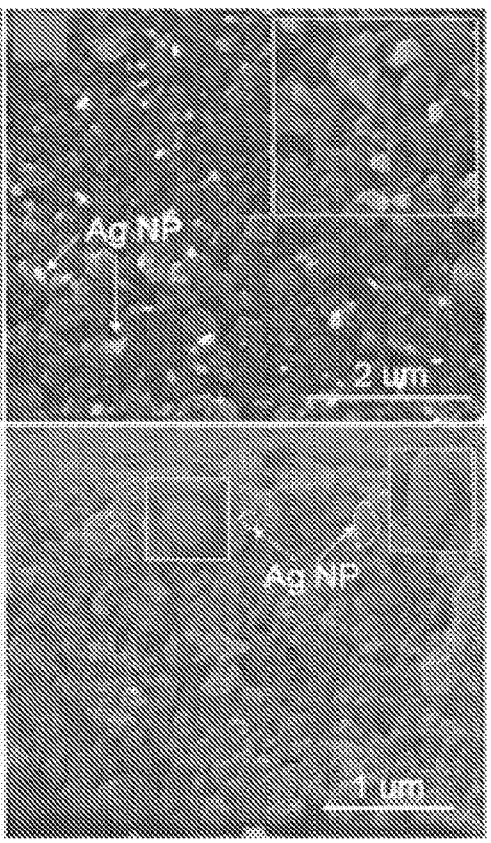
FIG. 31C | FIG. 31D

COMPOSITE NANOSTRUCTURES HAVING A CRUMPLED GRAPHENE OXIDE SHELL

CROSS-REFERENCE TO RELATED APPLICATION

This application is a continuation of U.S. application Ser. No. 15/126,843, filed on Sep. 16, 2016, which is a National Stage Entry of application PCT/US2015/021084, filed Mar. 17, 2015, which claims priority to U.S. Provisional Patent Application No. 61/954,221 filed on Mar. 17, 2014, which are hereby incorporated by reference in their entireties.

FIELD OF THE DISCLOSURE

The field of the disclosure relates to composite nanostructures and, in particular, composite nanostructures having a crumpled graphene oxide shell and a nanoparticle selected from titanium dioxide and silver within the graphene shell structure. Such nanostructures may be incorporated into filtration membranes that are suitable for purifying water for targeted separations and for human consumption.

BACKGROUND

Filtration and disinfection underpin important physical and chemical water treatment processes in modern society. With the development of such processes, such as sand filtration, chlorine disinfection, membrane separation etc., the sanitation and health conditions of human society have been fundamentally changed and improved. However, access to clean water is a continuing challenge. Concurrent filtration and surface-based disinfection, which inactivates pathogens, and thus lowers biofouling, simultaneously, has the potential to enhance the filtration efficiency.

A need exists for new materials and filtration membranes that enhance water filtration and disinfection that allow water molecules to quickly pass through but are antimicrobial and/or photoreactive.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a composite nanostructure comprising a crumpled graphene oxide shell, a titanium dioxide nanoparticle within the shell, and a silver nanoparticle bonded to the nanostructure. The nanostructure has a diameter of less than about 500 nm.

Another aspect of the present disclosure is directed to a composite nanostructure comprising a crumpled graphene oxide shell, a silver nanoparticle within the shell, and a silver nanoparticle bonded to the nanostructure. The nanostructure has a diameter of less than about 500 nm.

Yet another aspect of the present disclosure is directed to a method for producing a composite nanostructure. The method comprises preparing a pre-mixture of graphene oxide and at least one nanoparticle, wherein the at least one nanoparticle is selected from the group consisting of titanium dioxide, silver, magnetite, and mixtures thereof. The method further comprises spraying the pre-mixture with micron-sized water droplets, and carrying the sprayed pre-mixture into a tube furnace with a carrier gas. The method also comprises collecting the composite nanostructure downstream of the tube furnace, wherein the composite nanostructure comprises a crumpled graphene oxide shell encapsulating the at least one nanoparticle.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 31A is a SEM image of an unmodified CGO—TiO$_2$ membrane, FIG. 31B is a SEM image of membranes formed with silver nanoparticles, FIG. 31C is a SEM cross-sectional view of the surface at 20,000× magnification and FIG. 31D is a SEM cross-sectional view of the surface at 40,000× magnification;

DETAILED DESCRIPTION

Provisions of the present disclosure relate to composite nanostructures and filtration membranes incorporating such nanostructures. Filtration membranes may be used for filtering water to render water suitable for human consumption.

Composite Nanostructures

Composite nanostructures prepared in accordance with the present disclosure include a graphene oxide shell and a nanoparticle selected from titanium dioxide and silver. The composite nanostructures may be prepared by an aerosol route in which graphene oxide encapsulates the nanoparticle within the shell. The resulting nanoparticles may have a three-dimensional structure (e.g., crumpled balls).

Graphene oxide staring material may be produced by the so-called modified Hummers method as described by Hummers et al. in "Preparation of Graphitic Oxide", J. Am. Chem. Soc., vol. 80 (6), pp. 1339 (1958) which is incorporated herein for all relevant and consistent purposes.

Figure 1:
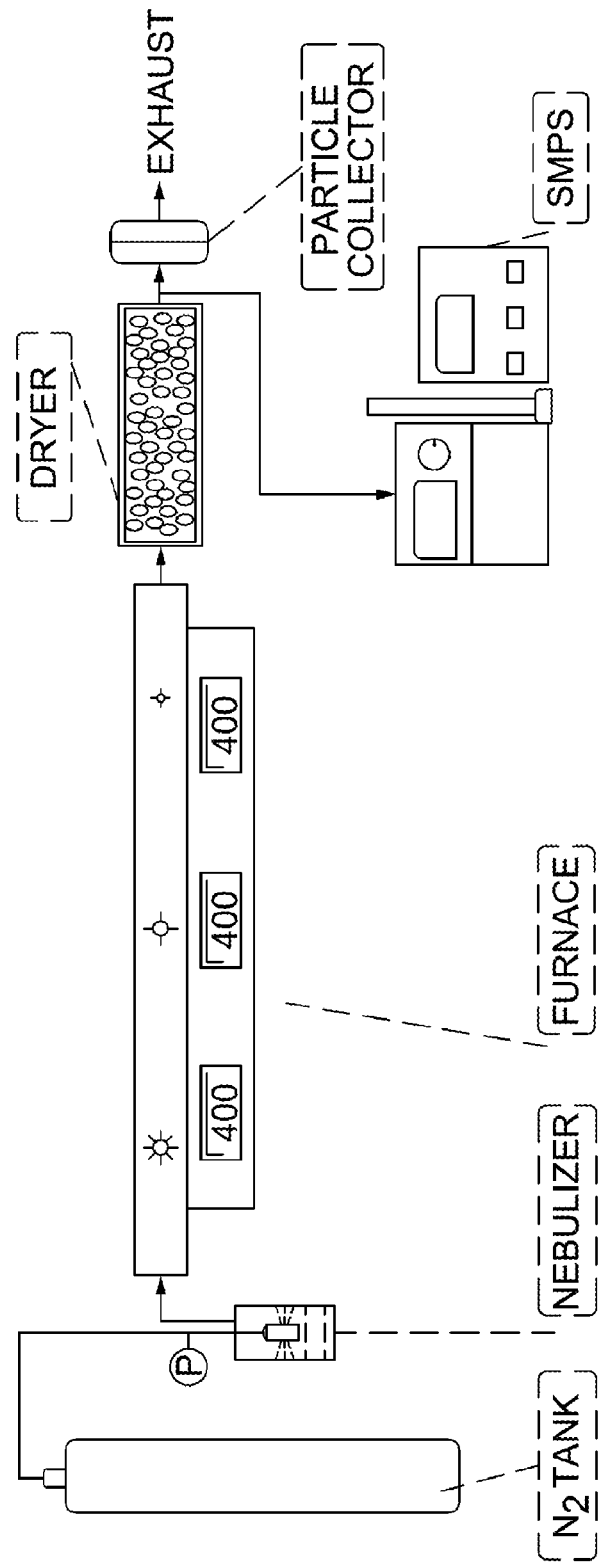
FIG. 1 is a schematic diagram of a furnace aerosol reactor for producing a composite nanostructure having a crumpled graphene oxide shell and a nanoparticle core.

The composite nanostructures may be produced from a graphene oxide and nanoparticle (i.e., titanium dioxide or silver) pre-mixture in the desired weight ratios. The pre-mixture is sprayed with micron-sized water droplets and carried by nitrogen into a tube furnace. Graphene oxide becomes crumpled under the evaporation-induced confinement force and encapsulates the nanoparticles. A suitable reactor system to produce such composite nanostructures is shown in FIG. 1. The composite nanostructures may be collected downstream of the reactor using a membrane filter. Suitable aerosol methods include those set forth by Wang et al. in "Evaporation-induced Crumpling of Graphene Oxide Nanosheets in Aerosolized Droplets: Confinement Force Relationship", J. Phys. Chem. Lett. Vol. 3(21), pp. 3228-3233 (2012) which is incorporated herein for all relevant and consistent purposes.

The resulting composite nanostructure is generally crumpled. In this regard, the resulting nanostructures may be combined in a nanostructure assembly wherein the assembly itself is crumpled. As referenced herein, "crumpled" structures have a crumpled morphology in which the nanostructure is folded and/or wrinkled forming channels, pores or voids within the nanostructure. In various embodiments, the structures may have a "crumpled ball" structure. Crumpled structures generally exclude nanostructure sheets and tubes unless stated otherwise. While the composite nanostructure is generally described as a crumpled nanostructure, flat or "two-dimensional" nanostructures may also be produced (e.g., as in a nanosheet).

In some embodiments of the present disclosure, the resulting crumpled graphene oxide nanoparticles have a diameter of less than about 750 nm, less than about 500 nm or even less than about 300 nm (e.g., from about 50 nm to about 500 nm, from about 50 nm to about 300 nm or from about 100 nm to 300 nm or from about 150 nm to about 250 or about 200 nm).

The composite nanostructures (crumpled graphene oxide encapsulating titanium dioxide or silver) may include pores of a diameter of less than about 200 nm or even less than about 150 nm or less than about 100 nm (e.g., from about 25 nm to about 200 or from about 50 nm to about 150 nm).

Suitable nanoparticles that may be encapsulated include titanium dioxide nanoparticles, silver nanoparticles, magnetite nanoparticles or mixtures thereof. Titanium dioxide may be relatively photo-reactive and silver may be relatively antibacterial which makes both materials useful in filtration membranes as described further below. Magnetite nanoparticles may impart magnetic properties on the nanoparticles.

In some embodiments, the crumpled nanoparticles are titanium oxide encapsulated by graphene oxide (CGO—TiO$_2$) with silver nanoparticles formed thereon ("formed silver nanoparticles"). Such structures may be produced by forming a crumpled GO—TiO$_2$ structure as described above followed by photocatalytic reduction of AG$^+$ on the CGO—TiO$_2$ nanostructures. Silver nanoparticles may be formed in-situ on the membrane surface (i.e., in the field as described below). Such silver nanoparticles that are formed in-situ are typically bonded to the CGO—TiO$_2$ structure but not encapsulated within the crumpled graphene oxide shell.

Filtration Membranes

The composite nanostructures described above may be incorporated into a filtration membrane for filtering fluids. The nanostructures (e.g., CGO—TiO$_2$ and CGO—Ag) may be attached to a support that provides the framework for the membrane. In some embodiments a cross-linking compound is used to attach the crumpled nanostructures to the membrane support. The cross-liking compound is bonded to the support and to the nanostructures. A suitable support is porous polyethersulfone and a suitable cross-linking compound is polyallylamine. Other suitable supports include: porous regenerated cellulose (hydrophilic), porous polycarbonate (hydrophilic), porous nitrocellulose (hydrophilic), porous polytetrafluoroethylene (PTFE) (hydrophobic), porous nylon (hydrophobic). Other suitable crosslinkers include: ethylene glycol, 1,3-propanedial, 1,4-butylene glycol, 1,4-cyclohexanedimethanol, 1,2,3,3,4,4,5,5-octolfluorohexandiol, ethylenediamine (EDA), butylenediamine (BDA), and p-phenylenediamine (PPD).

Figure 8:
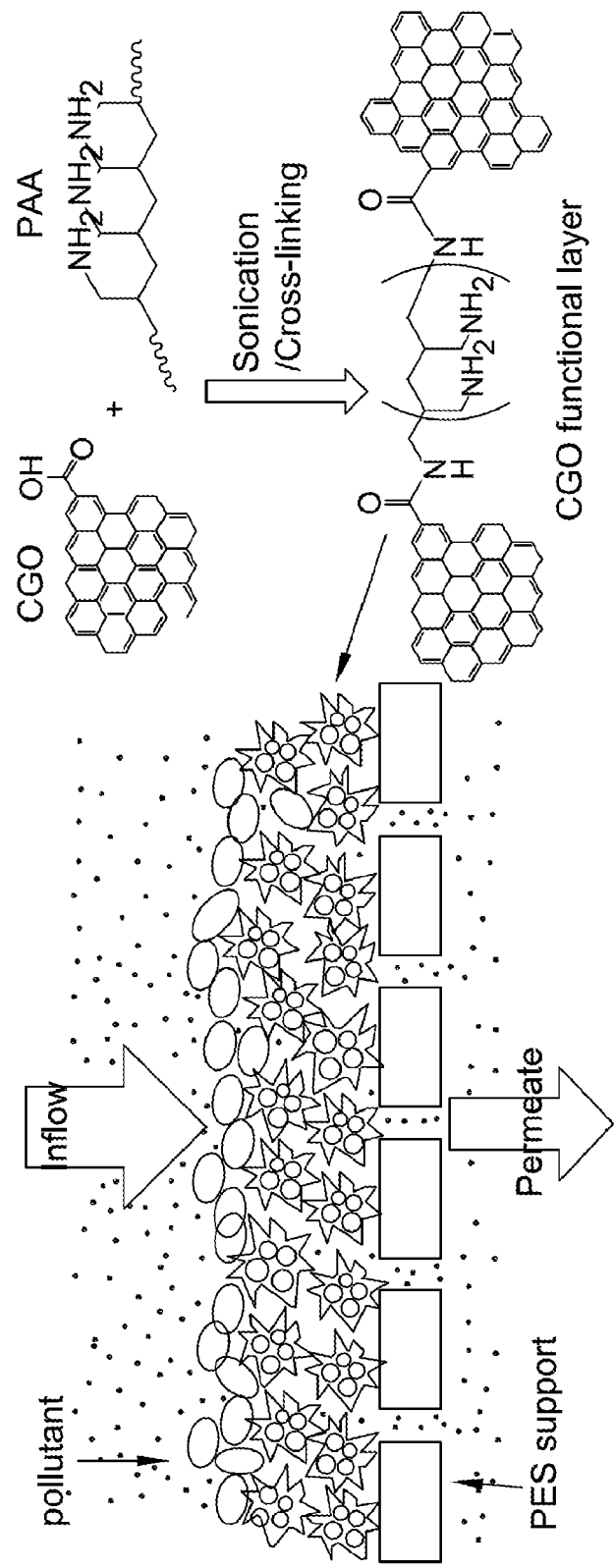
FIG. 8 is a schematic diagram showing the membrane and reaction mechanism between CGO (CGO—$TiO_2$ or CGO—Ag) and polyallylamine.

Cross-linkers such as polyallylamine may increase the stability of the crumpled graphene oxide nanostructures on the support and also act to fine-tune pore sizes of the composite membrane. The CGO membrane and cross-linking mechanism between CGO and PAA is shown in FIG. 8. Cross-linkers may form polyelectrolyte multilayers via layer-by-layer (LbL) and membranes may have enhanced bacterial anti-adhesive properties compared to unmodified membranes. Reactive amine groups in the alkyl chain may react with oxygen functional groups on the graphene oxide creating new C—N bonds resulting in strong chemical cross-linking.

In some embodiments, the crumpled nanoparticles are titanium oxide encapsulated by graphene oxide (GO—$TiO_2$) with Ag nanoparticles formed thereon ("formed Ag nanoparticles"). Such structures may be produced by forming a crumpled GO—$TiO_2$ structure as described above followed by photocatalytic reduction of $AG^+$ on the CGO—$TiO_2$ nanoparticles. Ag nanoparticles may be formed in-situ on the membrane surface (i.e., in the field as described below).

The membrane may also include composite nanostructures having a crumpled graphene shell and a magnetite nanoparticle within the shell, the composite nanostructures being attached to the membrane. Such structures impart magnetic properties to the membrane.

The filtration membrane may be a microfiltration, ultrafiltration, nanofiltration or reverse-osmosis-sized membrane. In various embodiments of the present disclosure, the membrane may have larger pore-sizes, between composites, of about 100-1000 kDa or less, pores within the composites themselves will be <100 Da, with some below 10 Da. The membrane may be used to filter fluids (e.g., water to be made suitable for human consumption) by contacting a fluid under pressure with the filtration membrane to produce a purified permeate and a retentate including various impurities (e.g., microbes, sugars, proteins, salts).

In some embodiments, the filtration membrane includes crumpled GO—$TiO_2$ with formed silver nanoparticles. Such nanoparticles may be deposited in-situ on the membrane surface by photocatalytic reduction of $Ag^+$ to regenerate the silver nanoparticles and antibacterial activity.

Compared to conventional materials, embodiments of the composite nanostructures having a crumpled graphene oxide shell encapsulating a nanoparticle (e.g., $TiO_2$, or silver) have several advantages. The disclosed method of manufacture (e.g., aerosol method) may be scaled up for low-cost, large-scale manufacture. The nanocomposites may be used in existing commercial methods of water filtration membrane manufacture or may be used to assemble new membrane structures. The materials may be tailored to be multifunctional (e.g., magnetic, photoactive and/or antimicrobial). The composite nanostructures may be designed to self-assemble into membranes. The self-assembled membranes may be cleaned by disassembling the composite membranes in-situ, cleaning the monomers and allowing the composites to reassemble into membrane structures. In embodiments in which the membranes are photoactive (e.g., titanium dioxide nanoparticles), self-cleaning reactions may be catalyzed by UV light irradiation and appropriate water chemistries (e.g., the presence of oxygen).

EXAMPLES

The processes of the present disclosure are further illustrated by the following Examples. These Examples should not be viewed in a limiting sense.

Example 1: Production and Characterization of Composite Nanostructures

Two composite nanomaterials, crumpled graphene oxide encapsulated titanium dioxide ("CG—$TiO_2$") and crumpled graphene oxide encapsulating silver ("CG—Ag"), were synthesized using a furnace aerosol reactor schematically shown in FIG. 1. The aerosol-synthesized crumpled graphene oxide nanocomposites remained stable in water for several months without sedimentation due to their much negative surface charge (CGO—$TiO_2$: −51.5±0.6 mV; CGO—Ag: −42.5±1.1 mV).

The ζ-potential and hydrodynamic diameter of aqueous crumpled graphene oxide nanocomposites were measured using Zetasizer Nano ZS system (Malvern Instruments). The morphology and size were also examined by field emission scanning electron microscopy (FESEM, NOVA NanoSEM 230) and transmission electron microscopy (TEM, Tecnai™ Spirit). To quantify the metal composition, the nanocomposites were digested in concentrated $HNO_3$ and HCl (v:v=3:1) at 100° C. for 10 hours. The resulting solution was then filtered (Millipore, PTFE 20 nm) and diluted for inductively coupled plasma mass spectrometry (ICP-MS, Agilent 7500 cc) analysis. Fourier transform infrared spectrometer (FTIR, Nicolette Nexus 470) was used to gain key bonding information of the CGO nanocomposites.

Figure 2:
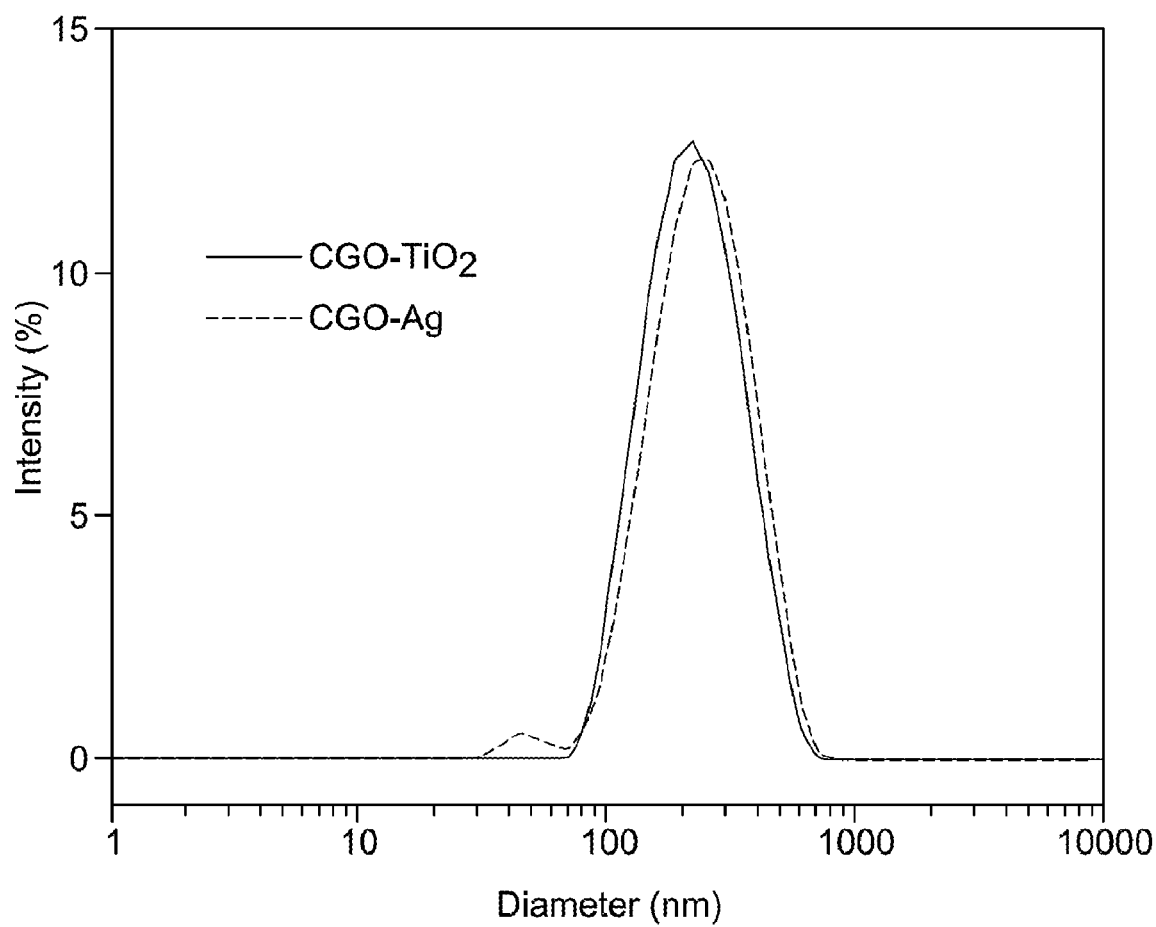
FIG. 2 is a graph showing the hydrodynamic diameter of CGO—$TiO_2$ and CG—Ag measures by DLS.
Figure 3:
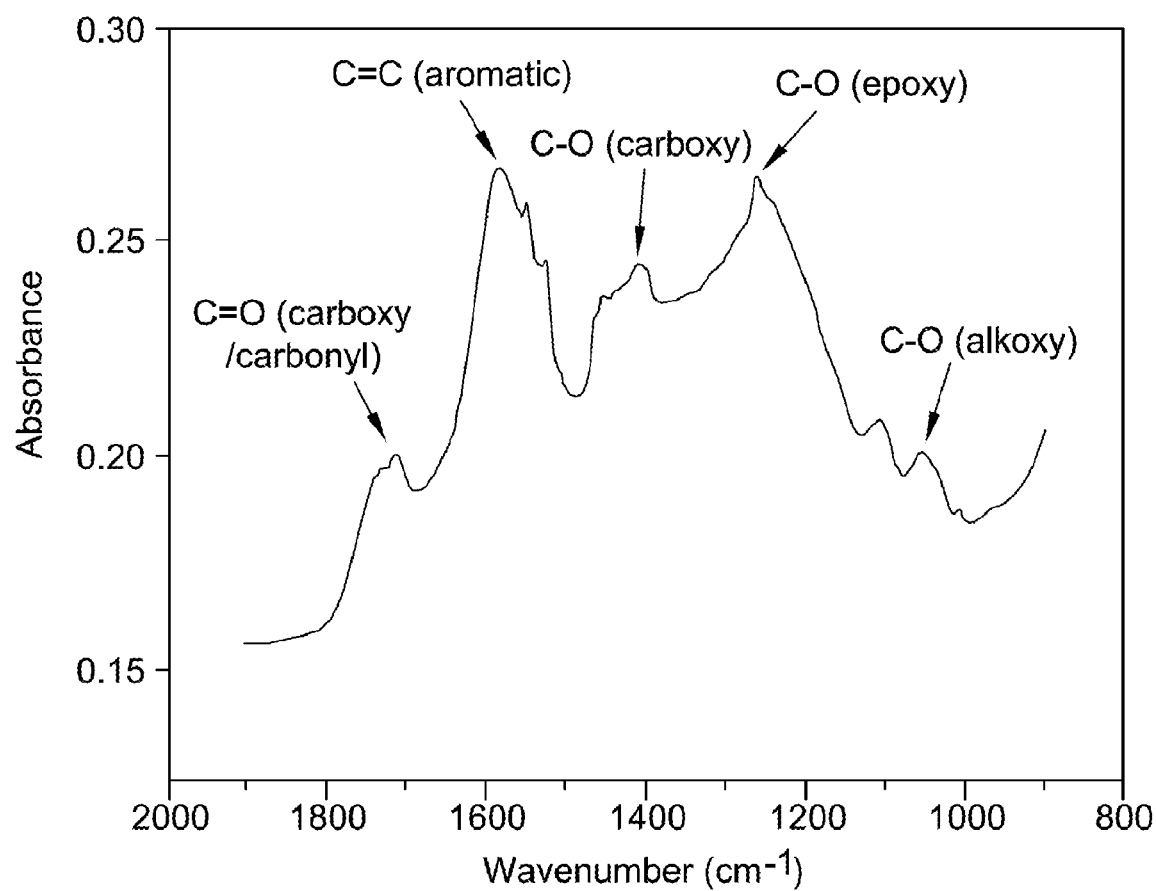
FIG. 3 is a graph showing the FTIR spectrum of CGO—$TiO_2$.
Figure 4:
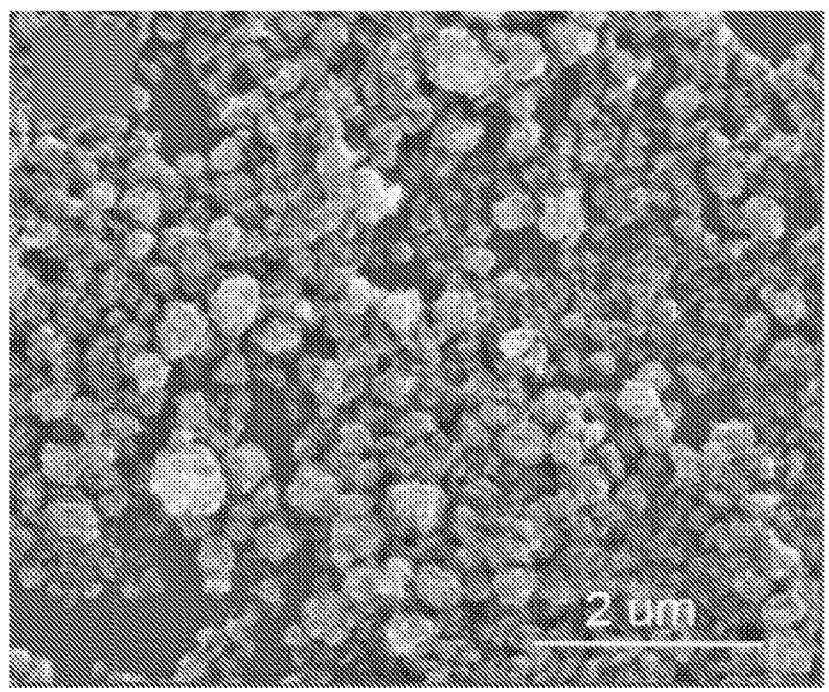
FIG. 4 is a SEM image of CGO—$TiO_2$.
Figure 5:
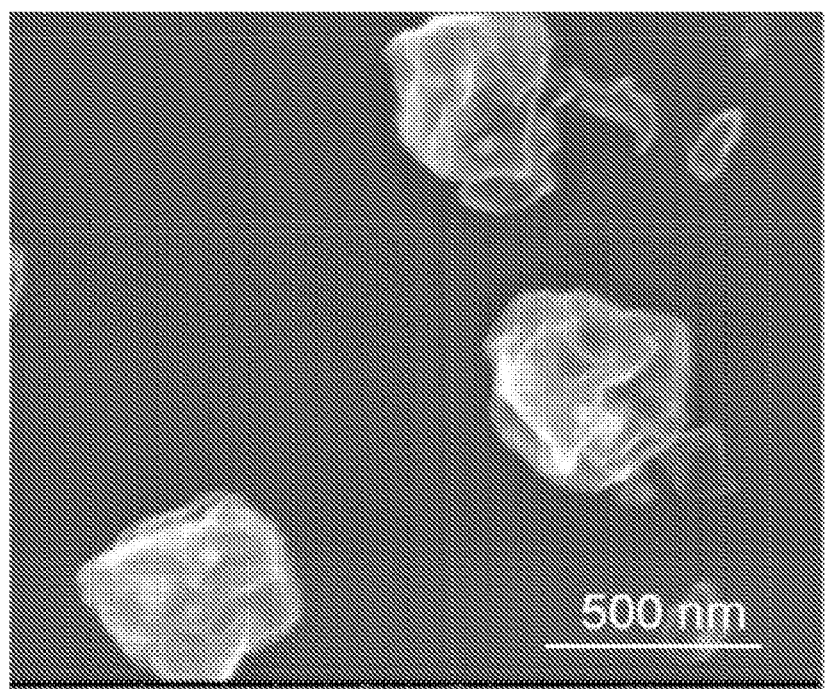
FIG. 5 is a SEM image of CGO—Ag.
Figure 6:
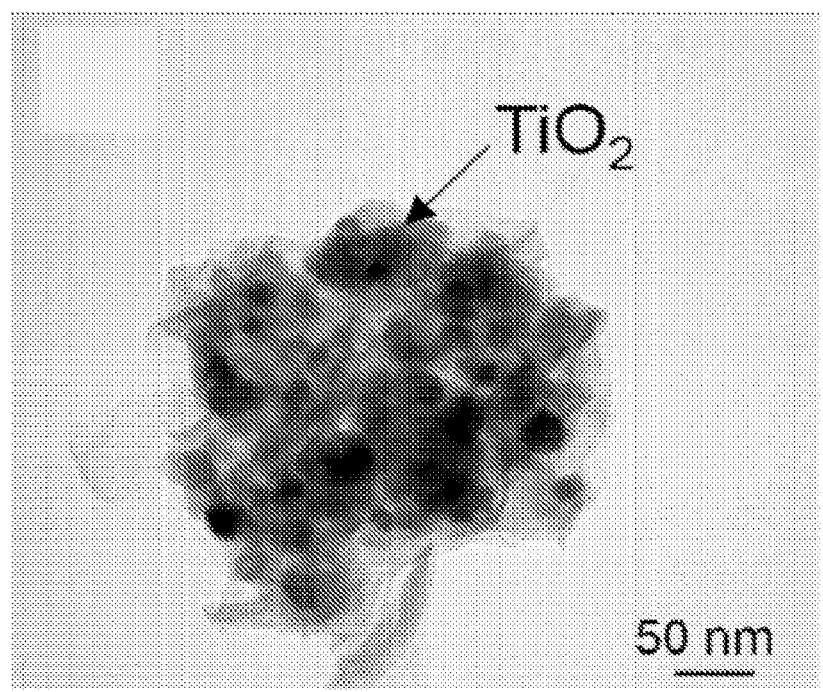
FIG. 6 is a TEM image of CGO—$TiO_2$.
Figure 7:
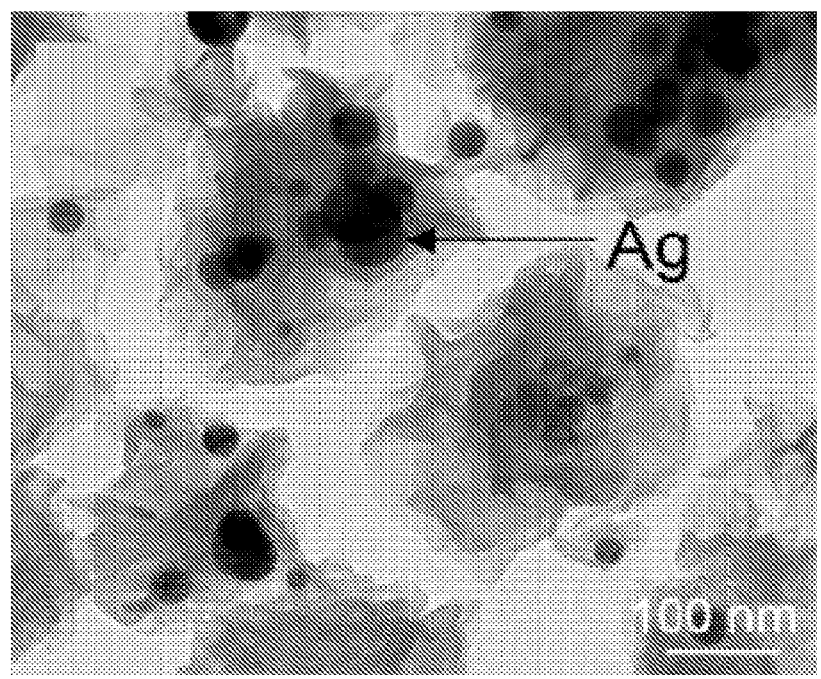
FIG. 7 is a TEM image of CGO—Ag.

It was observed from DLS results that the average sizes of CG—$TiO_2$ and CG—Ag were 200±1 nm, and 207±1 nm respectively (see FIG. 2), which were also confirmed by SEM and TEM measurements. The TEM and SEM graphs of CGO—$TiO_2$ and CGO—Ag in FIGS. 4-7 show a clear core-shell nanostructure with crumpled graphene oxide as the outer shell and $TiO_2$/Ag nanoparticles as the inner core (as indicated by the arrows in the Figures). FTIR was used to characterize CGO—$TiO_2$ nanocomposites. The FTIR spectrum of CGO—$TiO_2$ was shown in FIG. 3 which indicates the presence of C—O (alkoxy), C—O (epoxy), C—O (carboxy), C═C (aromatic), and also C═O (carboxy/carbonyl) stretches.

Example 2: Production and Characterization of Filtration Membranes

Polyallylamine (PAA, Sigma Aldrich, Mw 12000) was used to cross-link the CGO—$TiO_2$ nanostructures to a polyethersulfone (PES) support membrane with a robust crumpled graphene oxide surface layer. Crumpled graphene oxide $TiO_2$ nanocomposites and a PAA mixture (6 mg CGO/150 μL PAA, 12 mg CGO/300 μL PAA, and 20 mg CGO/500 μL PAA) were sonicated for 3 h before being vacuum filtered onto a polyethersulfone (PES) support membrane (Sterlitech, 20 run) at a very low rate. The PES membrane was also soaked in 1% PAA aqueous solution for 3 hours before the deposition. The obtained membrane was then air-dried and used in subsequent characterization and performance tests.

Membrane surface morphology was investigated by FESEM (NOVA NanoSEM 230). Before imaging, membranes were spin-coated with gold for 60 seconds (Headway PWM32-PS-CB15PL). Membrane surface roughness was studied using an atomic force microscopy (AFM, Veeco NanoMan) in a tapping mode. The PES support membrane and CGO surface layer were also studied using Raman spectroscopy (Renishaw inVia).

Figure 9:
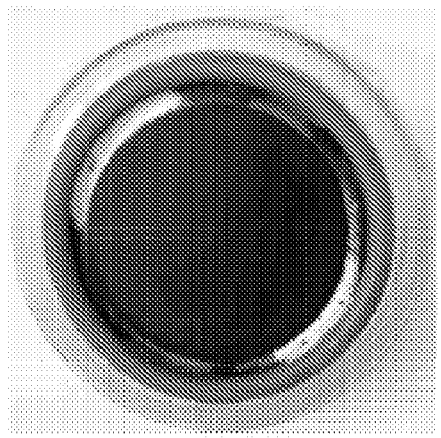
FIG. 9 is a digital photo of a CGO—$TiO_2$ membrane.
Figure 10:
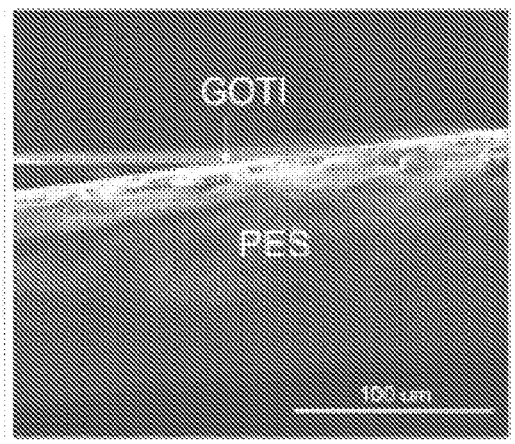
FIG. 10 is a SEM cross-sectional view of a CGO—$TiO_2$ membrane.
Figure 11:
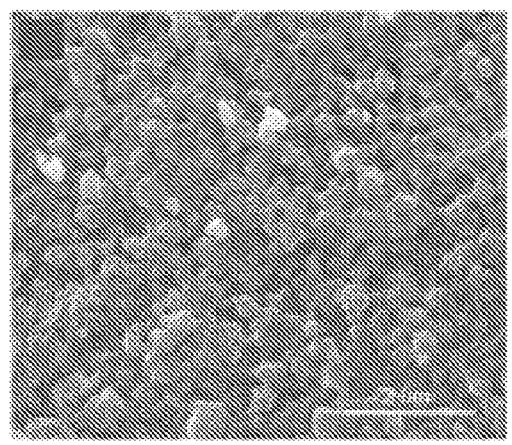
FIG. 11 is a SEM top view of a CGO—$TiO_2$ membrane.
Figure 34:
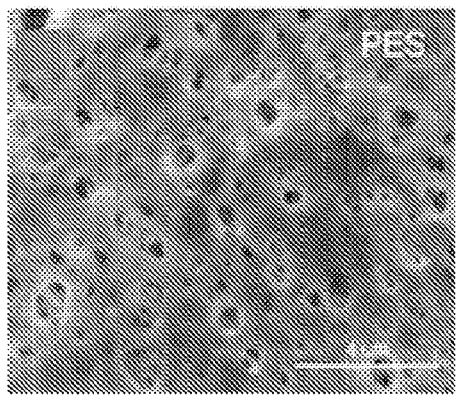
FIG. 34 is a SEM top view of a blank PEM support.
Figure 35:
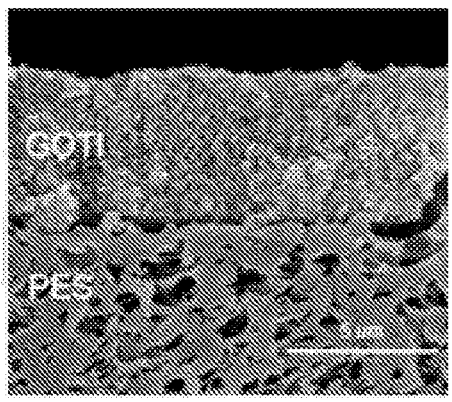
FIG. 35 is a SEM cross-sectional view of a CGO—TiO$_2$ membrane.

The deposited CGO—$TiO_2$ membrane (FIG. 9) exhibited a black color, typical of CGO nanocomposites. A representative CGO—$TiO_2$ membrane with a deposited mass of 6 mg, was subject to SEM (FIGS. 10-11 and 35), AFM (FIG. 12), and also Raman spectroscopy analysis (FIG. 13). A functional layer consisting of cross-linked CGO—$TiO_2$ nanocomposites was observed being on top of the PES support (FIG. 10). In this case, 6 mg deposited mass corresponds to 3.6 μm depth, which is a 3.4% increase in thickness compared to the unmodified PES support (106 μm in thickness as measured by SEM). Near-spherical CGO—$TiO_2$ nanocomposites were observed as being stacked tightly thereby forming intrinsic pores (FIG. 11). Most pores were observed to be smaller than 100 nm. A blank PES support was also subject to SEM (FIG. 34).

Figure 12:
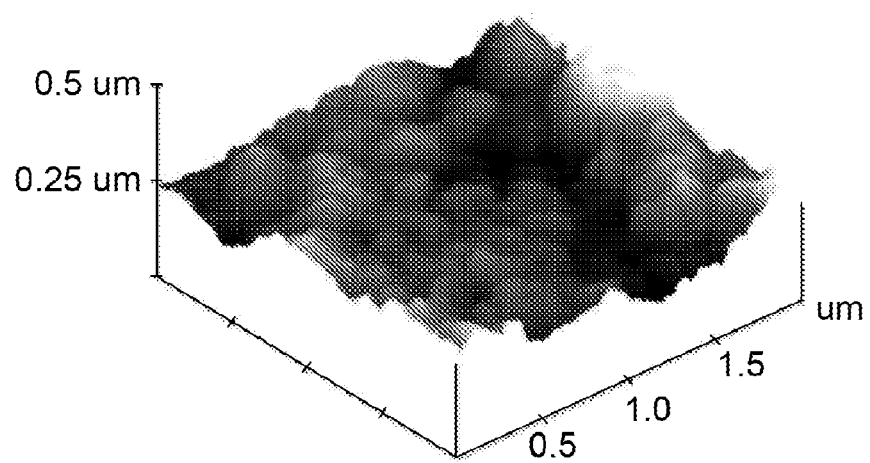
FIG. 12 is a 3D AFM surface image of a CGO—$TiO_2$ membrane.
Figure 13:
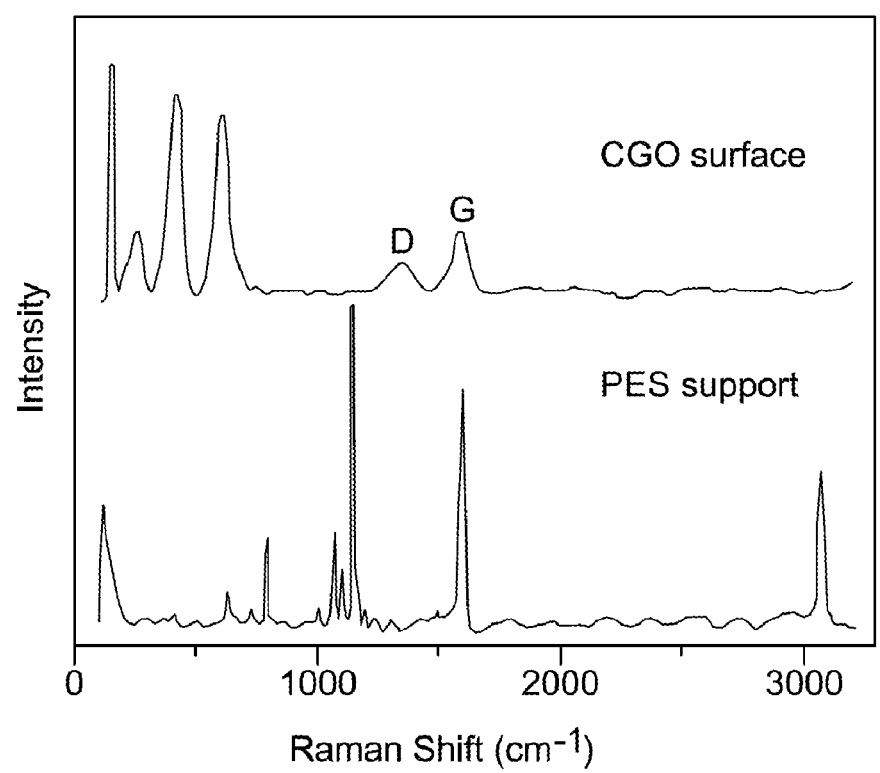
FIG. 13 is a graph showing the Raman spectrum of a CGO—$TiO_2$ surface layer and PES support membrane.

The membrane surface was observed to be a peak-valley morphology, as shown in both SEM and AFM results (FIGS. 11 and 12). The average surface roughness of the membrane was determined as 52.4±5.8 nm through AFM analysis. FIG. 12 shows the Raman spectrum of the CGO—TiO$_2$ surface layer and PES support membrane. Two characteristic bands for graphene oxide are shown in FIG. 13—D band (1341 cm$^{-1}$) and G band (1586 cm$^{-1}$). The D band is associated with the distortion from the hexagonal lattice (such as sp$^a$ type defect); while the G band corresponds to pure sp$^2$ hybridized graphitic carbon. The ratio between intensities of the G band and D band ($I_G/I_D$) is 2.04 in this case, close to that of PAA-cross-linked carbon nanotubes.

Permeability experiments were conducted for the as-synthesized CGO—TiO$_2$ membranes under a direct flow and constant pressure dead-end filtration mode, while measuring the permeated water flux. Solutions in the storage tank (Millipore Amicon 8050) was pressurized by N$_2$ at 1 bar and flew into a filter holder (47 mm, Pall Life Science) in which the membrane is placed. Permeated solution was measured over time (thus flux) by an integrated electronic balance (Mettler Toledo ML1502E) and the data was automatically logged at 30 second intervals. Membrane rejection was evaluated by filtering two typical model contaminants—an organic dye, methyl orange (MO, 7.5 mg/L, Mw=327.3 Da, Sigma Aldrich), and one protein, bovine serum albumin (BSA, 10 mg/L, Mw=~66.5 kDa, Sigma Aldrich). The concentrations of MO and BSA were analyzed using a UV-vis spectrophotometer (Varian Bio 50) at a wavelength of 463 and 220 nm, respectively. The rejection R equals, $$R=(1-C_P/C_F)\times 100\% \quad \text{(Formula 1)}$$

where $C_P$ and $C_F$ are the molecule concentrations in the permeate and water feed, respectively.

Figure 14:
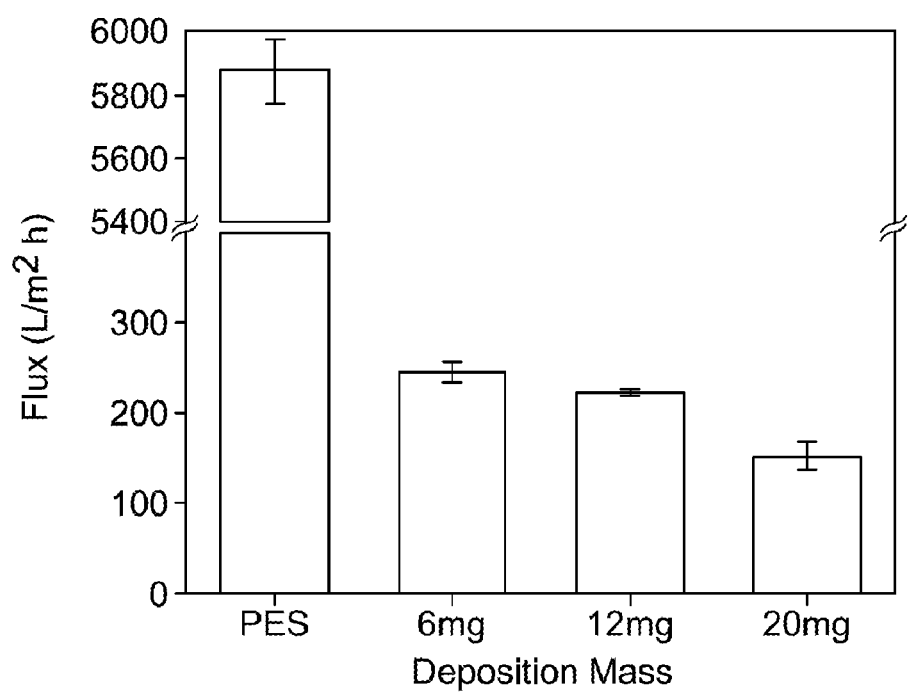
FIG. 14 is a chart showing water flux with varied amounts of deposited CGO—$TiO_2$.

Pure water flux of CGO—TiO$_2$ membranes with different deposited CGO—TiO$_2$ mass were shown in FIG. 14. Water flux of the PES support was 5872±95 L/m$^2$·h. After being coated with a layer of cross-linked CGO—TiO$_2$ nanocomposites (6 mg), the water flux decreased to 246±11 L/m$^2$·h. Unlike coating with flat GO nanosheets, where water flux does not decrease monotonically as deposition mass increases, water flux decreased further to 152±14 L/m$^2$·h when CGO—TiO$_2$ mass reached 20 mg.

Figure 15:
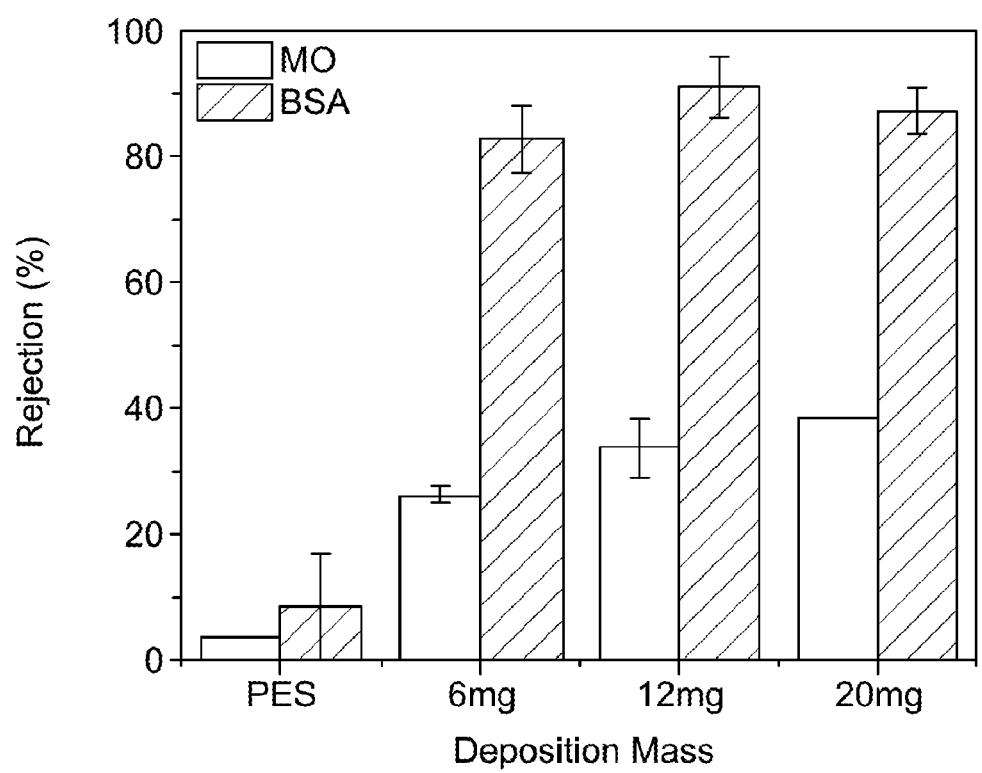
FIG. 15 is a chart showing rejection of methyl orange (MO) and bovine serum albumin (BSA) with varied amounts of deposited CGO—$TiO_2$.

As seen in FIG. 15, the PES support membrane was characterized by less than 10% rejection of both MO and BSA. With a CGO coating, the rejection rate increased dramatically. By coating the PES support with 6 mg CGO—TiO$_2$, the rejection of MO and BSA has reached 26% and 83% respectively. When the deposition mass is further increased, rejection of both MO and BSA was increased accordingly but to a lesser degree.

Figure 19:
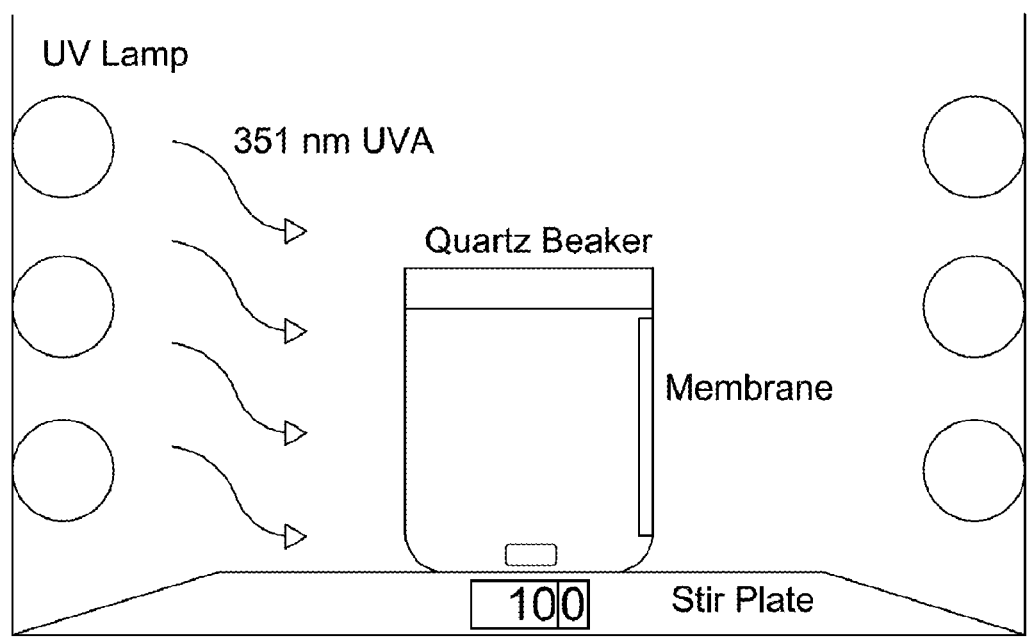
FIG. 19 is a schematic of the photocatalytic degradation setup of Example 2.

The photo-reactivity of the CGO—TiO$_2$ membrane was evaluated by degradation of MO in a batch mode. A quartz beaker was used as the reactor and the customized UV reactor was applied to provide UV light irradiation, which was centered at 351 nm and with an intensity of 900 pw/cm$^2$ (FIG. 19). Methyl orange (70 mL, 7.5 mg/L) was added into the beakers under three scenarios: with a CGO—TiO$_2$ membrane (20 mg CGO—TiO$_2$ deposited onto a PES support membrane), a blank PES membrane, and pure MO solution. In the first 30 min, the sets were kept in the dark to achieve adsorption equilibrium. The solution was sampled at each 30 minutes and measured by UV-Vis. The MO concentration was determined by the absorbance at 463 nm.

Figure 16:
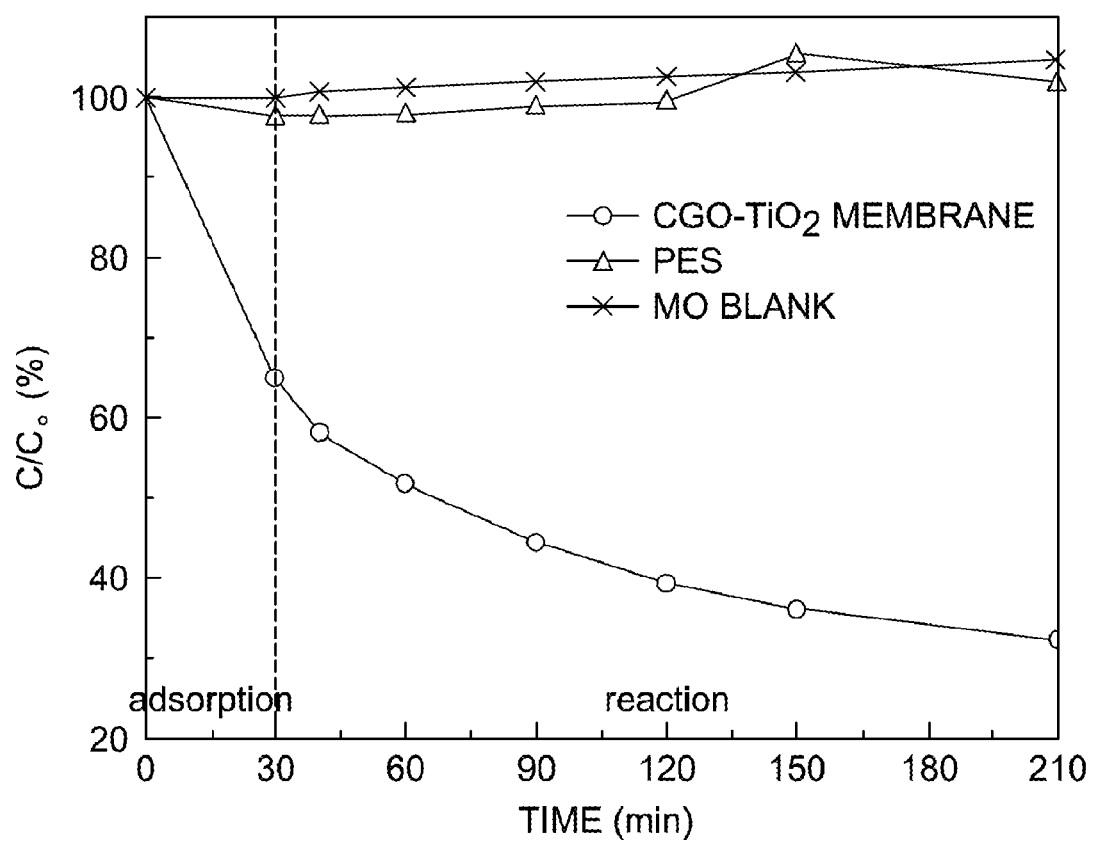
FIG. 16 is a graph showing MO concentration change with time under UV light irradiation.

The photocatalytic degradation results are shown in FIG. 16. As shown in FIG. 16, MO was photocatalytically degraded with CGO—TiO$_2$ membranes and no reaction took place with PES. Also, MO was stable under UV light irradiation. The initial adsorption of MO by the CGO—TiO$_2$ membrane nearly approached 40% of the total MO in the solution. Under UV light irradiation, MO concentration with the CGO—TiO$_2$ membrane began to decrease gradually. After 3 hours of UV reaction, about 35% MO still remained in the solution. For the other two cases (PES and MO blank) the concentration did not decrease. Light intensity had a significant impact on the photocatalytic degradation of MO. When light intensity decreased from 900 μW/cm$^2$ to 520 μW/cm$^2$, the pseudo first-order reaction rate constant also decreased from 0.0061 min$^{-1}$ to 0.0036 min$^{-1}$.

The release of Ag$^+$ from CGO—Ag nanocomposites and membranes was then analyzed. CGO—Ag nanocomposites (100 mL, 3 mg/L) were adjusted by acetate buffer to reach pH of 4, 5, and 6. The solutions were sampled at different time intervals until 144 hours. Each sample was filtered by using a syringe filter (Millipore, PES 0.2 μm) and then acidified using HNO$_3$ before ICP-MS analysis. CGO—Ag membranes were placed in 25 mL water and mildly shaken at a rate of 60 min$^{-1}$. Each 24 hours, the water was replaced by fresh MilliQ water. The replaced water was acidified by HNO$_3$ and analyzed by ICP-MS for Ag$^+$ concentration.

Figure 17:
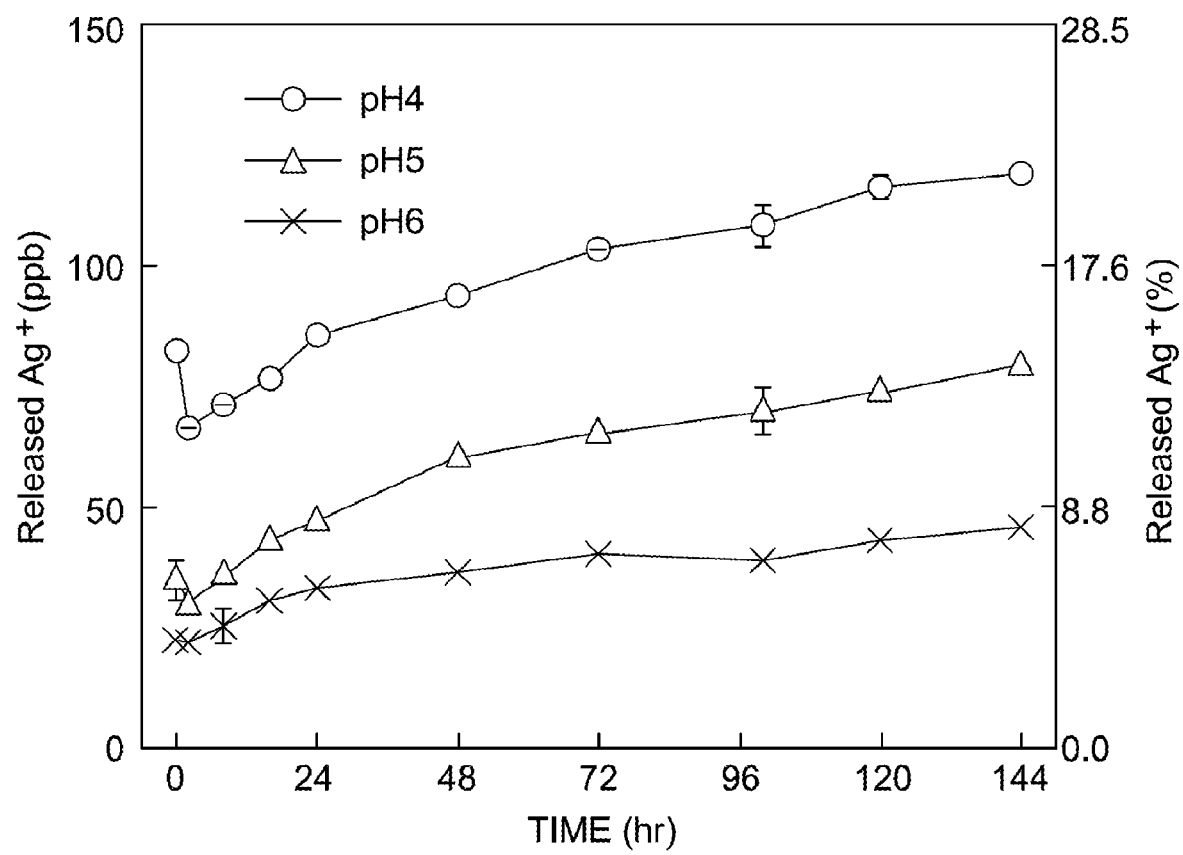
FIG. 17 is a graph showing $Ag^+$ released from CGO—Ag composite nanostructures at different pH.
Figure 18:
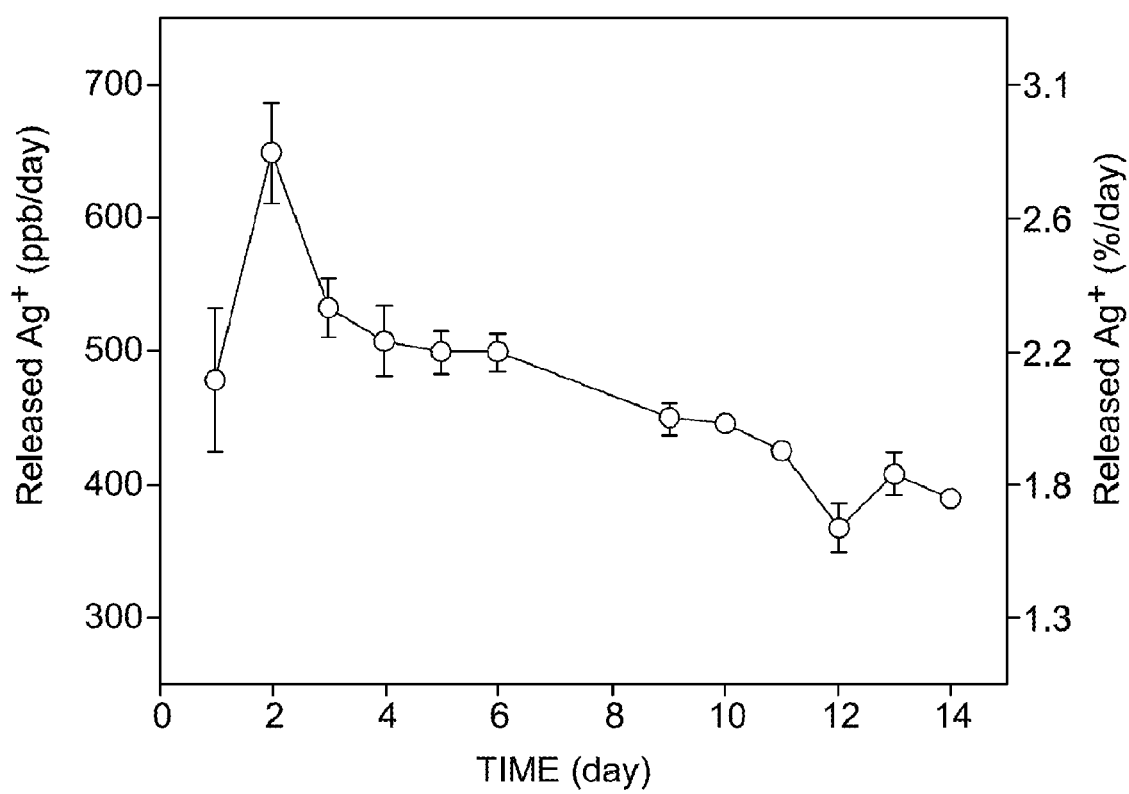
FIG. 18 is a graph showing $Ag^+$ released from a membrane having CGO—Ag composite nanostructures attached thereto.

For Ag$^+$ release from CGO—Ag nanocomposites, the total release increases with time under all three pHs (accumulative release, FIG. 17). Under pH 6, the Ag$^+$ release as a percentage of the total Ag in the nanocomposites increased from 4.0% to 8.1% after 144 hours ([Ag$^+$]$_{144\ h}$=46 ppb). Under lower pH, such as 4, the release was more significant—from 14.6% to 21.0% ([Ag$^+$]$_{144\ h}$=119 ppb). FIG. 18 shows the daily release of Ag$^+$ from CGO—Ag membrane (deposition mass=3 mg).

Generally, the release as a percentage of the total Ag decreased with time, from >2.9% (day 2) to 1.7% (day 14). The measured day 1 release was smaller than that of day 2, most likely due to initial adsorption of released Ag+ onto the CGO surface (strong electrostatic interaction between Ag$^+$ and negatively charged functional groups), which significantly decreased the aqueous Ag$^+$ concentration. The Ag$^+$ release experiments demonstrated the potential application of CGO—Ag membrane surface for antibacterial purposes. However, for nanomaterials that act through dissolution or release of a secondary agent (such as Ag in this case), the reactivity depends on the initial loading of the functional agent and the release rate which indicates should materials would benefit from regeneration.

Example 3: In situ Ag Nanoparticle Formation on Crumpled GO—TiO$_2$ Surface

CGO—TiO$_2$ nanocomposite membranes were synthesized by the method of Example 2 with 3 mg deposited CGO—TiO$_2$ were used to study in-situ formation of silver nanoparticles. An as-synthesized membrane was placed in 70 mL, 15 mg/L AgNO$_3$ solution initially to achieve adsorption equilibrium for 1 hour. The membrane coupon was then taken out of the solution and placed in the quartz beaker with another 70 mL, 15 mg/L AgNO$_3$ solution. The reaction was conducted in the customized UV reactor for 30 minutes and the membrane coupon was placed with the active (deposited) side towards the UV light direction. The concentrations of $Ag^+$ before and after adsorption and reaction were measured using ICP-MS.

The $Ag^+$ released from the reacted membrane was monitored by measuring the $Ag^+$ concentration in the outflow. Pure water (50 ml) was passed through the holder and the $Ag^+$ concentration in the solution was measured by ICP-MS while the flow rate was monitored. The experiments were repeated for 5 times when $Ag^+$ concentration in the outflow was found to reach a steady state.

Figure 20:
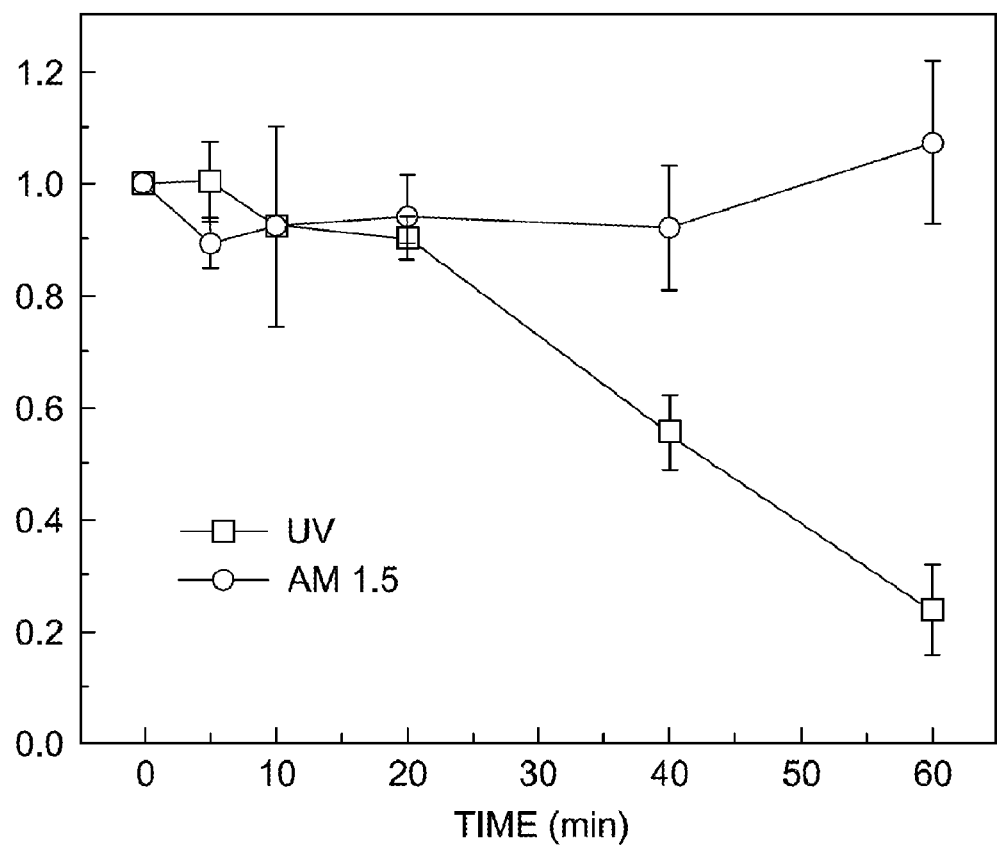
FIG. 20 is a graph showing the change in $Ag^+$ concentration under UV and solar light irradiation.

As shown in FIG. 20, the reduction of $Ag^+$ to $Ag^0$ was observed to happen quickly under UV light irradiation. The $Ag^+$ concentration continued to decrease throughout the entire reaction period, with about ¼ of the original aqueous concentration remaining after 60 minutes of reaction (C60 min/C0=0.24±0.08). The concentration reduction in the first 20 minutes was not as significant as that in the following time, possibly due to initial reaction with (the large amount of) pre-adsorbed $Ag^+$. The total amount of silver being reduced was calculated to be 854 mg/g of CGO—$TiO_2$.

For reactions under simulated solar light irradiation, $Ag^+$ concentration decreased slightly to $C/C_o$=~0.9 in the first 5 minutes and maintained almost constant in the following reaction time, indicating the source of formed silver nanoparticles was mainly from pre-adsorbed $Ag^+$. The difference between AM 1.5 and UV reaction kinetics shows that CGO—$TiO_2$ is principally UV active, and the reaction is expected to be proportional to UV light intensity. Under UV, with the abundant availability of electrons, the formation of silver nanoparticles may be extremely rapid. For example, in case of $C_o$=10 mg/L $AgNO_3$, the concentration of $Ag^+$ has been observed to decrease to below the detection limit (<1 ppb) within only 10 minutes of reaction.

Figure 21:
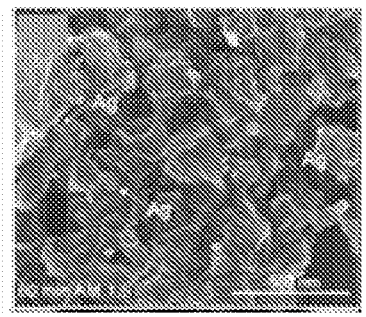
FIG. 21 is a SEM image of CGO—$TiO_2$ and formed silver nanoparticles after solar light irradiation.
Figure 22:
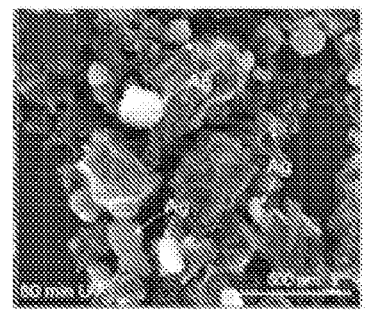
FIG. 22 is a SEM image of CGO—$TiO_2$ and formed silver nanoparticles after UV light irradiation.
Figure 23:
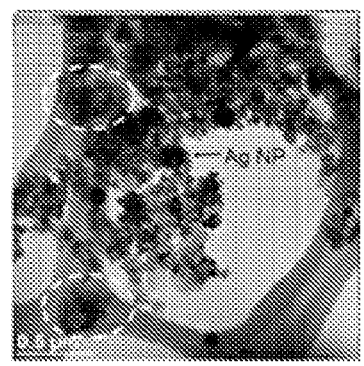
FIG. 23 is a TEM image of CGO—$TiO_2$ and formed silver nanoparticles.
Figure 24:
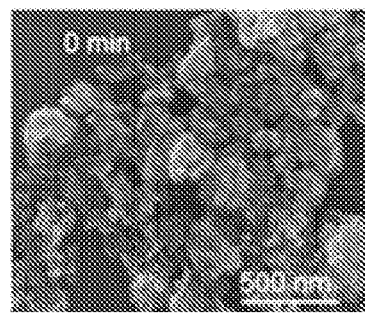
FIG. 24 is as SEM image of CGO—$TiO_2$.
Figure 25:
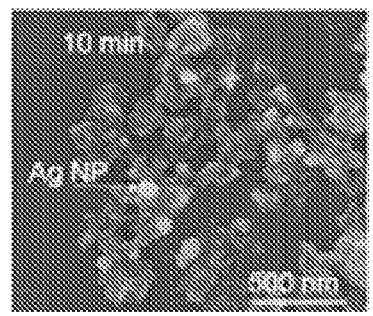
FIG. 25 is a SEM image of CGO—$TiO_2$ with as-synthesized silver nanoparticles after 10 minutes of reaction.
Figure 26:
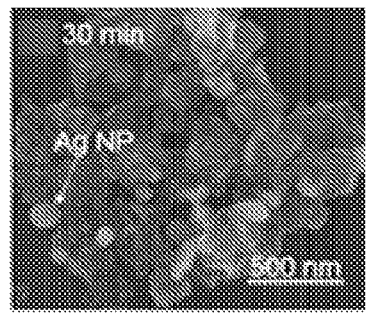
FIG. 26 is a SEM image of CGO—TiO$_2$ with as-synthesized silver nanoparticles after 30 minutes of reaction.

Further SEM examination confirmed the dramatic difference between formation kinetics of the two cases (FIGS. 21 and 22). FIG. 21 shows that under simulated solar light, fewer silver nanoparticles may be observed after 60 minutes of reaction, and with small sizes (usually <100 nm) (indicated by white arrow in the figure). On the other hand, under UV light irradiation, many more silver nanoparticles were formed and these nanoparticles have larger sizes ranging from dozens of nm to a few hundred nm. The formation of silver nanoparticles was also examined and confirmed by TEM-EELS (FIG. 23).

Figure 27:
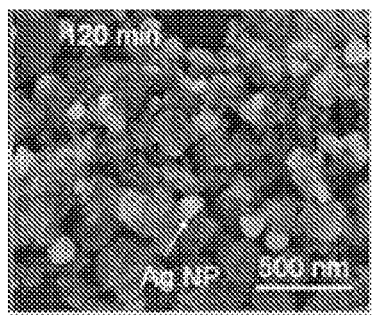
FIG. 27 is a SEM image of CGO—TiO$_2$ with as-synthesized silver nanoparticles after 120 minutes of reaction.

The size and morphology evolution of silver nanoparticles with irradiation time was shown in FIGS. 24-27. Initially, only CGO—$TiO_2$ nanocomposites can be visualized (FIG. 24), with a crumpled "paper-ball-like" morphology. After 10 minutes, large amounts of silver nanoparticles (shown as white dots indicated by the white arrow in FIG. 25) appeared, most of which are in polyhedron shapes. Such silver nanoparticles were observed with growth into larger sizes after 30 minutes reaction (FIG. 26), and more shapes were found, which include pyramid, sphere, cylinder and flake (FIG. 27).

Figure 28:
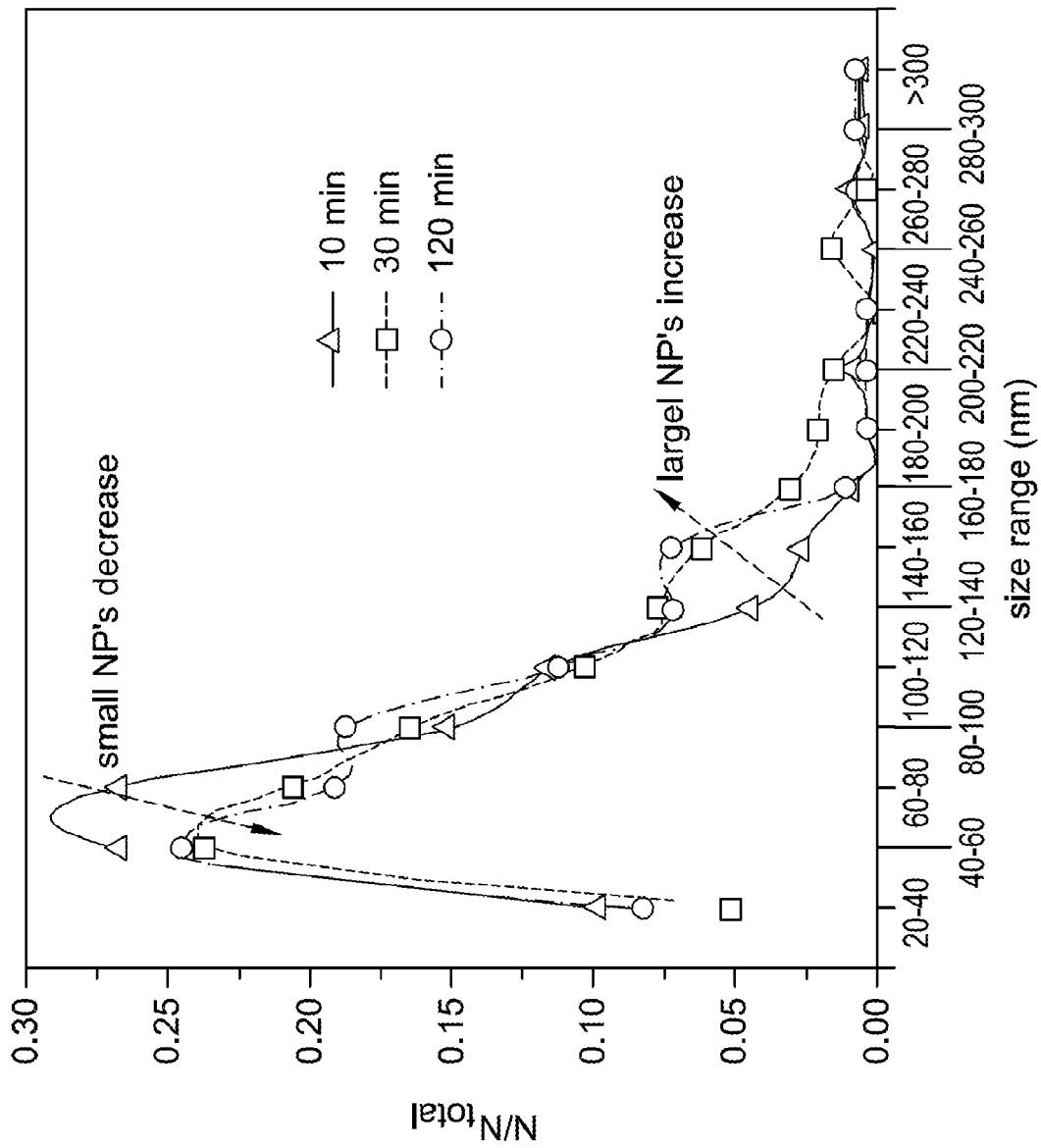
FIG. 28 is a graph showing the size distribution of silver nanoparticles at different reaction times.

The sizes were identified as the longest dimension of each nanoparticle imaged by SEM (FIGS. 24-27), and for each time, >150 nanoparticles were examined (total nanoparticles being 583). Size distribution analysis shows that most nanoparticles are between 40 and 120 nm regardless of the reaction time (the peaks in FIG. 28). While silver nanoparticles were rapidly formed in the first 10 minutes of the reaction, it was found that from 10 minutes to 30 minutes the fraction of small nanoparticles decreased (mostly 20-80 nm) and the number of large particles increased (largely 140-220 nm) (FIG. 27); and the size distribution did not change significantly from 30 minutes to 120 minutes. For example, at 10 minutes, particles with sizes between 40-80 nm account for 54% of the total number; while at 30 minute and 120 minute, the number has decreased to 45% and 44% respectively, due to the production of larger particles (e.g., 7% (10 minutes) to 14% (30 and 120 minutes) in the size range between 120-160 nm). The samples were also examined by TEM, which again confirmed the formation of silver nanoparticles with sizes mainly between 40 and 120 nm.

The assembled membrane surface reveals peak-valley morphology (FIG. 28), and maintained abundant surface hydrophilicity (oxygen functionality) even after cross-linking, as identified by both FTIR and Raman Spectroscopy. Three mg CGO—$TiO_2$ was deposited onto the PES support, resulting in a water flux of 509±136 L/($m^2$·h·bar), being decreased from >5800 L/($m^2$·h·bar) with only PES support (FIG. 30).

Figure 32:
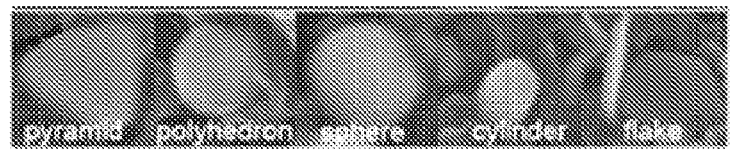
FIG. 32 is a SEM image of silver nanoparticles formed with different morphologies.

For the 3 mg CGO—$TiO_2$ deposited membrane, the adsorbed $Ag^+$ mass equals 53.5±8.0 μg (0.018 mg $Ag^+$/mg of CGO—$TiO_2$), being much smaller compared to that of monodisperse CGO—$TiO_2$ nanocomposites. This may be attributed to reduction of adsorption sites and accessibility due to packing and cross-linking of CGOs. Photocatalytic reduction experiment shows an average of 160.4±44.7 μg further addition of silver nanoparticles onto the membrane within 30 minutes (0.053 mg $Ag^+$/mg of CGO—$TiO_2$), which is almost 3 times that of adsorption. The functionalized membranes were examined by SEM, as shown in FIGS. 31A-D. FIG. 31A shows an unmodified CGO—$TiO_2$ membrane. After 30 minute UV irradiation, silver nanoparticles were observed spread all over the surface (FIG. 31B). Further close examination on the SEM images of the membrane surface shows that, unlike silver nanoparticles formed on monodisperse CGO—$TiO_2$, which have multiple shapes (FIG. 32), in-situ formed silver nanoparticles on the surface mostly have flake shapes (FIG. 31B inset). Further, silver nanoparticles were found to be only formed within a certain depth below the surface, likely a few hundred nm (corresponding to the size of a CGO nanocomposite, FIG. 31C and FIG. 31D).

Figure 29:
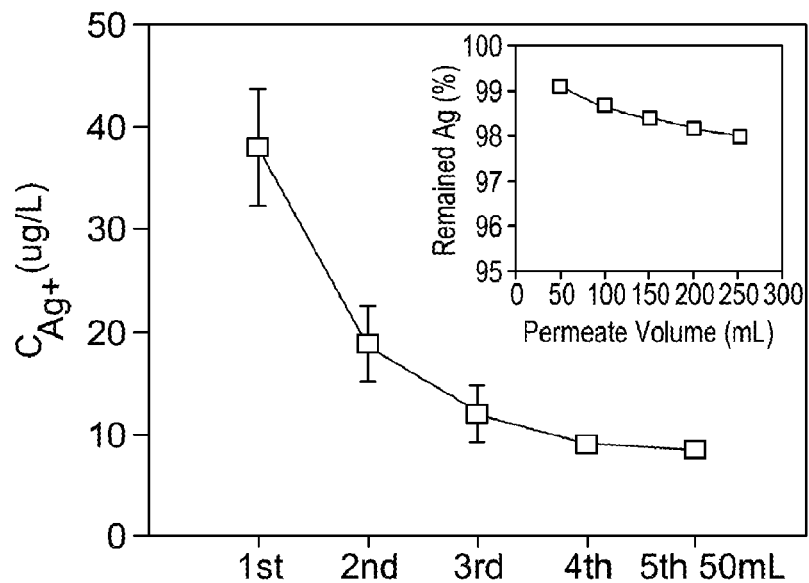
FIG. 29 is the Ag$^=$ concentration in the permeate (pure water) and as a mass percentage of total loaded silver with permeate volume (inset)
Figure 30:
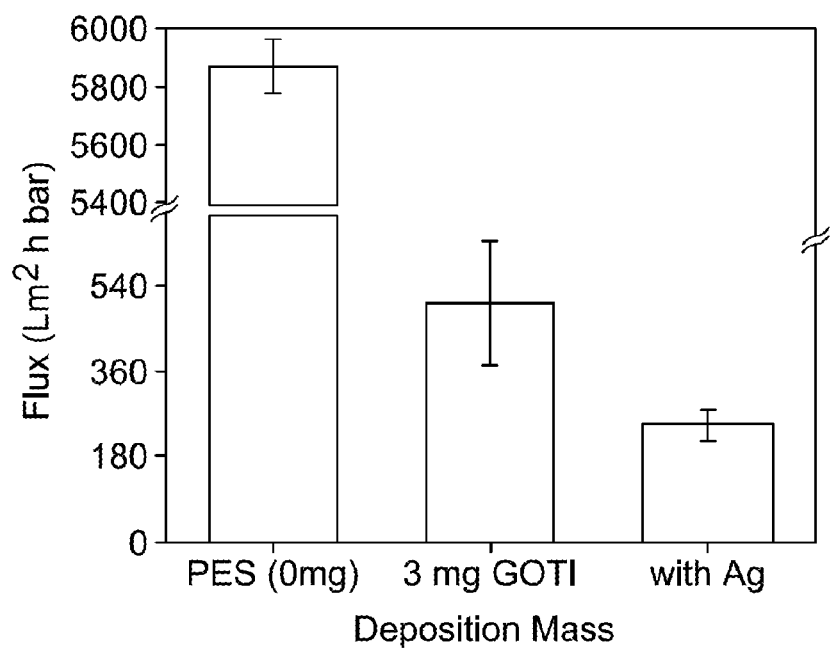
FIG. 30 is a chart showing water flux with different membranes.

Silver nanoparticle formation leads to further reduction of pure water flux to 249±35 L/($m^2$·h·bar), largely due to blocking of pores (FIG. 30). This may be expected as such assembled membranes are with pores smaller than 10 nm, which is relatively small compared to the size of formed silver nanoparticles. The leaching of $Ag^+$ from the loaded membranes was monitored by measuring its concentration in the permeated water. For the first 50 mL permeate (MilliQ water as feed water), the $Ag^+$ (bulk) concentration was 38.1±5.7 μg/L, while that would decrease to 18.9±3.7, 12.1±2.7, 9.0±0.1, and 8.6±0.7 μg/L for the following four tests (each with 50 mL MilliQ water) (FIG. 29). The high concentrations of $Ag^+$ at the beginning could be attributed to incompletely reduced $Ag^+$, as not all of the adsorbed silver ions were expected to be transformed into silver nanoparticles limited by factors such as the penetration of light. The $Ag^+$ concentration in the permeate reaches constant gradually (~9 μg/L), which were considered to come from the dissolution of silver nanoparticles.

As shown in the inset graph in FIG. 29, there was still 98% of silver remaining in/on the membrane after permeation of 0.25 L water. Based on material balance of silver, such a bench-top system in our lab (47 mm filter holder, Pall Life Science), with a filter area of only 8.1 $cm^2$, can filter up to 24.9 L of water until all silver was leached out from the system (or ~123 hours of constant function time under operation pressure of 1 bar).

The membrane antimicrobial activity against *E. coli* (Gram-negative, ATCC 11775) and *B. subtilis* (Gram-positive, ATCC 6633), were tested for both unmodified and modified membranes. 0.5% of the overnight bacterial culture was inoculated into fresh LB medium and then cultured under 37° C. to reach exponential phase. The bacterial dispersion was then centrifuged and washed by 0.9% saline solution twice before being dispersed again into 0.9% saline solution to reach a concentration of $10^7$ #/mL. The antimicrobial property was evaluated by the inactivation of cells on the membrane surfaces. 400 μL of such bacterial dispersion was placed in contact with the active side of the membrane coupon for 2 hours (the side with deposited CGO—$TiO_2$ and formed silver nanoparticles). After 2 hours, the upper bulk dispersion was removed and the membrane coupon was rinsed by sufficient 0.9% saline solution. Then the rinsed membrane coupon was sonicated mildly in 5 mL 0.9% saline solution for 7 minutes, and 100 μL of the suspension was withdrawn, serially diluted and spread over LB plates. The plates were then incubated at 37° C. for overnight in the dark before counting the bacterial colonies (CFUs). All antibacterial tests were conducted at least in triplicate to ensure reproducibility.

Figure 33:
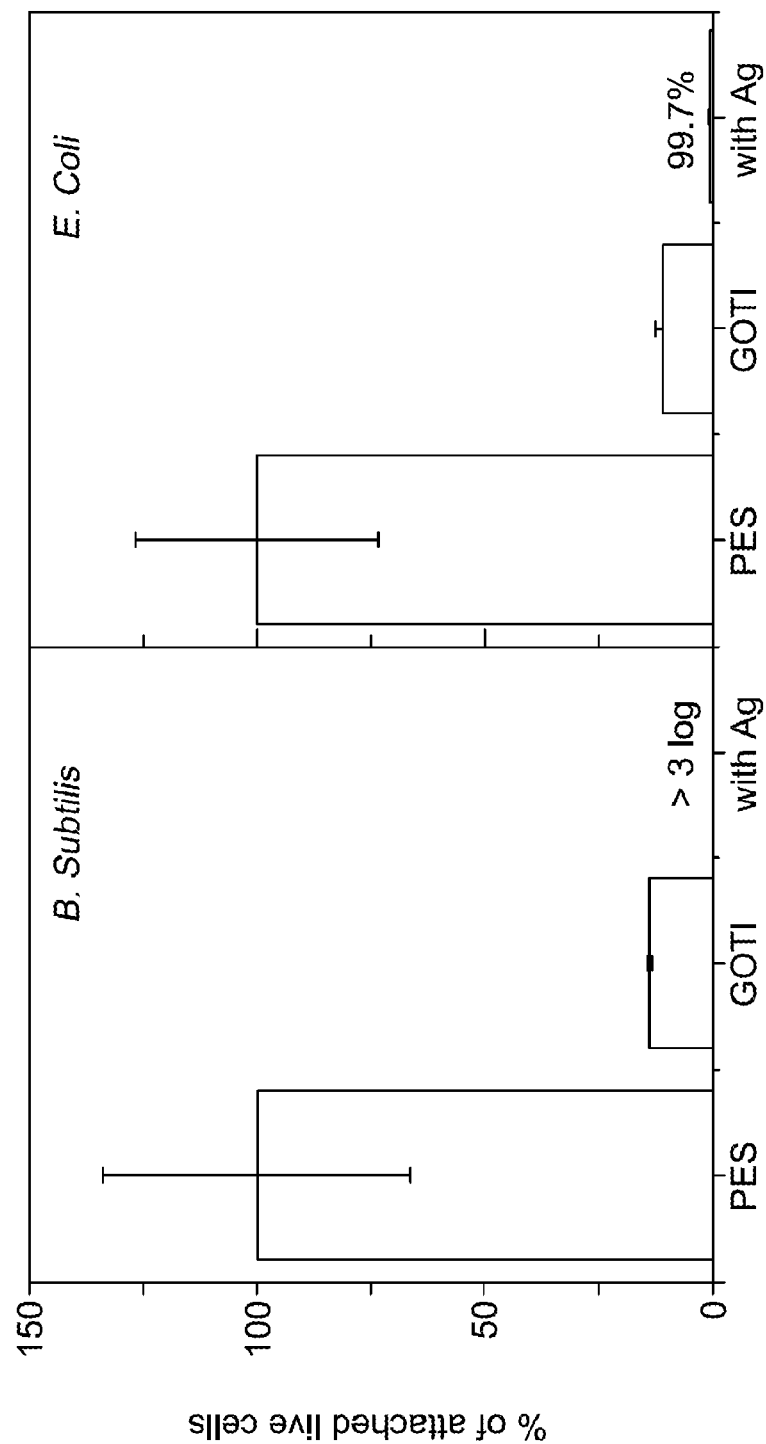
FIG. 33 is a chart showing surface attached live cells after contacting a membrane with *B. Subtilis* and *E. Coli*.

Unlike silver nanoparticles that were encapsulated, the in situ formed silver nanoparticles were attached onto the membrane surface, which was in direct contact with the bacteria. The surface inactivation of *E. Coli* and *B. Subtilis* on PES, CGO—$TiO_2$-PES, and CGO—$TiO_2$—Ag-PES membranes. By comparing the CFUs plated from these membranes, CGO—$TiO_2$-PES membrane retained approximately 13.7% and 11.2% of *B. Subtilis* and *E. Coli* cells compared to that of PES only membrane. With silver formation, the CGOTI-Ag-PES membranes reached about 3 log removal of both bacteria (FIG. 33).

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:
1. A composite nanostructure comprising:
  a crumpled graphene oxide shell; and
  a titanium dioxide nanoparticle within the shell;
  a silver nanoparticle bonded to the nanostructure; and
  wherein the nanostructure has a diameter of less than about 500 nm, and wherein the nanostructure includes pores having a diameter of from about 25 nm to about 200 nm.
2. The composite nanostructure as set forth in claim 1, wherein an assembly of the nanostructures is flat.
3. The composite nanostructure as set forth in claim 1, wherein an assembly of the nanostructures is three-dimensional.
4. The composite nanostructure as set forth in claim 1, further comprising a silver nanoparticle within the shell.
5. The composite nanostructure as set forth in claim 1, further comprising a magnetite nanoparticle within the shell.
6. The composite nanostructure as set forth in claim 1, further comprising a silver nanoparticle and a magnetite particle within the shell.
7. A composite nanostructure comprising:
  a crumpled graphene oxide shell; and
  a silver nanoparticle within the shell;
  a silver nanoparticle bonded to the nanostructure; and
  wherein the nanostructure has a diameter of less than about 500 nm, and wherein the nanostructure includes pores having a diameter of less than about 200 nm.
8. The composite nanostructure as set forth in claim 7, wherein an assembly of the nanostructures is flat.
9. The composite nanostructure as set forth in claim 7, wherein an assembly of the nanostructures is three-dimensional.
10. The composite nanostructure as set forth in claim 7, further comprising a titanium dioxide nanoparticle within the shell.
11. The composite nanostructure as set forth in claim 7, further comprising a magnetite nanoparticle within the shell.
12. A method for producing a composite nanostructure according to claim 1, the method comprising:
  preparing a pre-mixture of graphene oxide and at least one nanoparticle, wherein the at least one nanoparticle is selected from the group consisting of titanium dioxide, silver, magnetite, and mixtures thereof;
  spraying the pre-mixture with micron-sized water droplets;
  carrying the sprayed pre-mixture into a tube furnace with a carrier gas; and
  collecting the composite nanostructure downstream of the tube furnace, wherein the composite nanostructure comprises a crumpled graphene oxide shell encapsulating the at least one nanoparticle.
13. The method as set forth in claim 12, wherein the at least one nanoparticle is titanium dioxide.
14. The method as set forth in claim 12, wherein the at least one nanoparticle is silver.
15. The method as set forth in claim 12, wherein the at least one nanoparticle is magnetite.
16. The method as set forth in claim 12, further comprising photocatalytically reducing silver nanoparticles onto the composite nanostructure.
17. The method as set forth in claim 16, wherein the photocatalytically reducing comprises solar light irradiation.
18. The method as set forth in claim 16, wherein the photocatalytically reducing comprises UV light irradiation.

\* \* \* \* \*